United States Patent
Uchino et al.

(10) Patent No.: US 10,171,544 B2
(45) Date of Patent: Jan. 1, 2019

(54) RADIO BASE STATION

(71) Applicant: NTT DOCOMO, INC., Tokyo (JP)

(72) Inventors: Tooru Uchino, Tokyo (JP); Akihito Hanaki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 43 days.

(21) Appl. No.: 15/027,908

(22) PCT Filed: Oct. 3, 2014

(86) PCT No.: PCT/JP2014/076539
§ 371 (c)(1),
(2) Date: Apr. 7, 2016

(87) PCT Pub. No.: WO2015/053186
PCT Pub. Date: Apr. 16, 2015

(65) Prior Publication Data
US 2016/0241624 A1    Aug. 18, 2016

(30) Foreign Application Priority Data

Oct. 8, 2013 (JP) ................................ 2013-211023

(51) Int. Cl.
   *H04W 76/00*     (2018.01)
   *H04L 29/06*     (2006.01)
   (Continued)

(52) U.S. Cl.
   CPC ........... *H04L 65/608* (2013.01); *H04W 36/06* (2013.01); *H04W 74/0808* (2013.01);
   (Continued)

(58) Field of Classification Search
   CPC ............. H04W 76/022; H04W 76/027; H04W 76/028; H04W 76/062; H04W 76/064;
   (Continued)

(56) References Cited

U.S. PATENT DOCUMENTS

| 8,331,337 | B2 * | 12/2012 | Kambe | ............... H04W 76/068 370/338 |
| 9,071,999 | B2 * | 6/2015 | Venkatachalam | ..... H04W 28/12 |

(Continued)

FOREIGN PATENT DOCUMENTS

| JP | 2005-509381 A | 4/2005 |
| JP | 2007-502073 A | 2/2007 |

(Continued)

OTHER PUBLICATIONS

3GPP TS 23.401 V11.4.0; "3rd Generation Partnership Project; Technical Specification Group Services and System Aspects; General Packet Radio Service (GPRS) enhancement for Evolved Universal Terrestrial Radio Access Network (E-UTRAN) access (Release 11)"; Dec. 2012 (284 pages); pp. 150-151.*

(Continued)

*Primary Examiner* — Andrew W Chriss
*Assistant Examiner* — Lalita W Pace
(74) *Attorney, Agent, or Firm* — Osha Liang LLP

(57) ABSTRACT

When a packet in which a "Static part" is changed is detected in a session established in a bearer, it is possible to prevent the packet from being discarded. A radio base station (eNB) according to the present invention includes a communication control unit (13) configured to control communication via a session (an RTP session or an RTCP session) with a mobile station (UE). The communication control unit (13) is configured such that, when a change in a "Static part" in a header of a received packet is detected, even if adding a new session to transmit the packet makes the number of sessions established in a bearer (#1) exceed a capability of the radio base station (eNB) or the mobile station (UE), the communication control unit (13) transmits the packet via the new session.

1 Claim, 6 Drawing Sheets

(51) Int. Cl.
| | |
|---|---|
| *H04W 36/06* | (2009.01) |
| *H04W 74/08* | (2009.01) |
| *H04W 76/30* | (2018.01) |
| *H04W 76/10* | (2018.01) |
| *H04W 88/02* | (2009.01) |
| *H04W 88/08* | (2009.01) |
| *H04W 76/32* | (2018.01) |
| *H04W 76/34* | (2018.01) |
| *H04W 76/20* | (2018.01) |
| *H04W 76/12* | (2018.01) |

(52) U.S. Cl.
CPC ........... *H04W 76/10* (2018.02); *H04W 76/30* (2018.02); *H04W 76/12* (2018.02); *H04W 76/20* (2018.02); *H04W 76/32* (2018.02); *H04W 76/34* (2018.02); *H04W 88/02* (2013.01); *H04W 88/08* (2013.01)

(58) Field of Classification Search
CPC ............. H04W 76/041; H04W 76/043; H04W 76/045; H04W 76/06; H04W 76/066; H04W 80/10; H04W 72/042; H04L 29/06197; H04L 29/06319; H04L 29/06367; H04L 47/76; H04L 47/762; H04L 47/745

See application file for complete search history.

(56) References Cited

U.S. PATENT DOCUMENTS

| | | | |
|---|---|---|---|
| 2004/0264433 A1 | 12/2004 | Melpignano | |
| 2005/0090273 A1 | 4/2005 | Jin et al. | |
| 2008/0056273 A1* | 3/2008 | Pelletier | H04L 69/04 370/395.21 |
| 2012/0011545 A1* | 1/2012 | Doets | H04N 7/17336 725/38 |
| 2012/0317273 A1* | 12/2012 | Shankarappa | H04L 47/821 709/224 |
| 2013/0279380 A1* | 10/2013 | Hong | H04H 20/72 370/310 |
| 2014/0105059 A1* | 4/2014 | Chaudhuri | H04W 76/10 370/253 |
| 2014/0133454 A1* | 5/2014 | Chan | H04L 69/04 370/331 |
| 2014/0181298 A1* | 6/2014 | Wang | H04L 41/5022 709/224 |
| 2015/0223284 A1* | 8/2015 | Jain | H04W 52/0225 370/329 |

FOREIGN PATENT DOCUMENTS

| | | |
|---|---|---|
| JP | 2008-072315 A | 3/2008 |
| JP | 2009-081669 A | 4/2009 |
| JP | 2010-004122 A | 1/2010 |
| JP | 2010-154367 A | 7/2010 |

OTHER PUBLICATIONS

International Search Report issued in PCT/JP2014/076539 dated Dec. 16, 2014 (2 pages).

Written Opinion of the International Searching Authority issued in PCT/JP2014/076539 dated Dec. 16, 2014 (4 pages).

3GPP TS 36.323 V11.2.0; "3rd Generation Partnership Project; Technical Specification Group Radio Access Network; Evolved Universal Terrestrial Radio Access (E-UTRA); Packet Data Convergence Protocol (PDCP) specification (Release 11)"; Mar. 2013 (27 pages).

Bormann, C. et al.; "RObust Header Compression (ROHC): Framework and four profiles: RTP,UDP, ESP, and uncompressed"; RFC3095; The Internet Society (2001), Jul. 2001 (168 pages).

Extended European Search Report in counterpart European Patent Application No. 14851995.2, dated Sep. 9, 016 (6 pages).

* cited by examiner

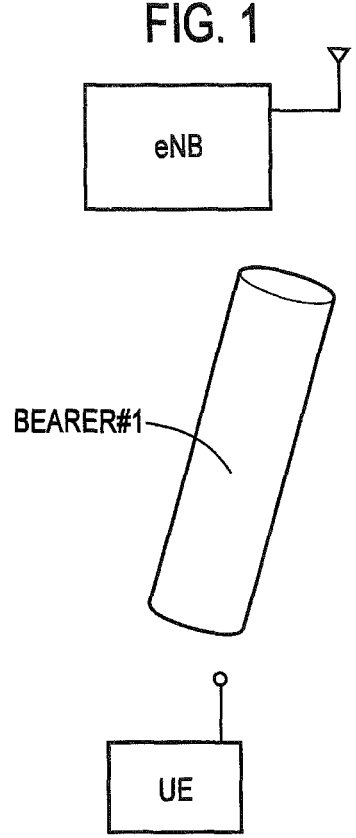
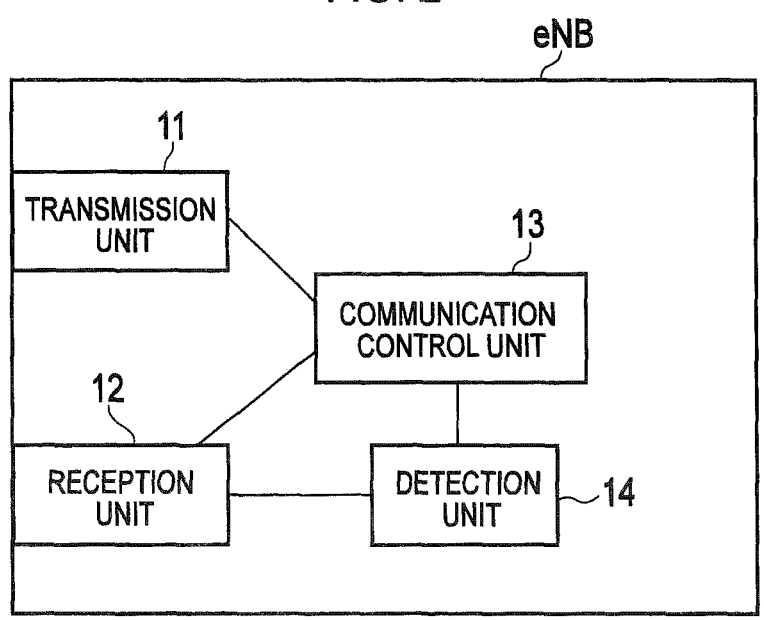

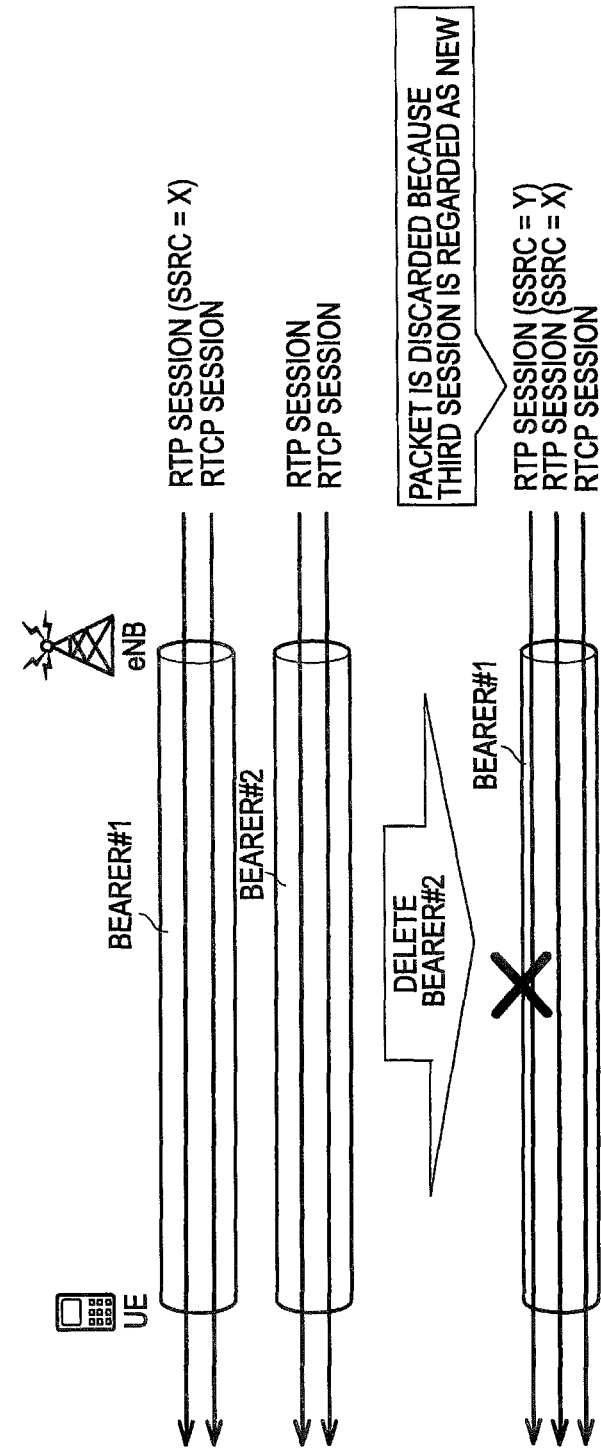

RADIO BASE STATION

TECHNICAL FIELD

The present invention relates to a radio base station.

BACKGROUND ART

As for a voice packet in LTE (Long Term Evolution), there are concerns about resource use efficiency and coverage because a ratio of an RTP (Real-time Transport Protocol) header, a UDP (User Datagram Protocol) header, and an IP (Internet Protocol) header to an RTP payload is high as illustrated in FIG. 8.

Therefore, PDCP (Packet Data Convergence Protocol) of LTE is expected to apply a header compression of ROHC (Robust Header Compression) method to a voice packet.

According to ROHC method, the number of bits to be actually transmitted can be reduced by transmitting only changed fields in the RTP header, the UDP header, and the IP header of each packet. ROHC method is capable of compressing an RTP header, a UDP header, and an IP header of each packet into a minimum of 3 bytes.

Hereafter, an invariable field in the RTP header, the UDP header, and the IP header is referred to as a "Static part". Examples of the "Static part" are an SSRC (Synchronization Source), which is an identifier in RTP layer, an IP address, and others.

Meanwhile, a variable field in the RTP header, the UDP header, and the IP header is referred to as a "dynamic part". Examples of the "dynamic part" are an "RTP timestamp", an "RTP-Sequence Number", a "UDP checksum", and others.

Multiple sessions (for example, RTP sessions or RTCP (RTP Control Protocol) sessions) may be established in a single bearer. Among the multiple sessions, how many sessions the header compression can be applied to depends on capabilities of a mobile station UE and a radio base station eNB.

PRIOR ART DOCUMENT

Non-Patent Document

Non-patent document 1: 3GPP TS36.323
Non-patent document 2: RFC3095

SUMMARY OF THE INVENTION

However, the radio base station eNB does not include a mechanism of performing operation by interpreting the contents of an RTP packet flowing in an RTP session and an RTCP packet flowing in an RTCP session. Accordingly, when the radio base station eNB detects a packet (for example, an RTP packet or an RTCP packet) in which a "Static part" is changed, the radio base station eNB cannot perform control by determining whether the packet is a packet flowing in a newly added session or a packet, in which "Static part" is changed, flowing in an existing session.

Therefore, when the radio base station eNB detects a packet, in which a "Static part" is changed, in a session established in a bearer, the radio base station eNB is bound to determine that a new session is added in the bearer.

As a result, there has been a problem in that in the case where the radio base station eNB determines that addition of the new session will make the number of sessions (for example, an RTP session or an RTCP session) established in a bearer exceed the capability of the radio base station eNB or the mobile station UE, the radio base station eNB rejects the addition of the new session.

For example, there has been a problem as illustrated in FIG. 9. When an SSRC in an RTP session is changed from "X" to "Y" under the constraint that the maximum number of sessions allowed to be established in a bearer is two, the RTP session is determined to be a new session added in the bearer#1, and an RTP packet flowing in the RTP session is discarded.

The present invention has been made in view of the above problem. An objective of the present invention is to provide a radio base station capable of, when a packet in which a "Static part" is changed is detected in a session established in a bearer, preventing the packet from being discarded.

In summary, a first feature of the present invention is a radio base station including a communication control unit configured to control communication with a mobile station via a session, in which the communication control unit is configured such that when a change in a static part in a header of a received packet is detected, even if adding a new session to transmit the packet makes the number of sessions established in a bearer exceed a capability of the radio base station or the mobile station, the communication control unit adds the new session and transmits the packet via the new session.

BRIEF DESCRIPTION OF THE DRAWINGS

FIG. 1 is an overall configuration diagram of a mobile communication system according to a first embodiment of the present invention.

FIG. 2 is a functional block diagram of a radio base station eNB according to the first embodiment of the present invention.

FIG. 9 is a diagram for explaining a conventional technique.

DETAILED DESCRIPTION

Figure 3:
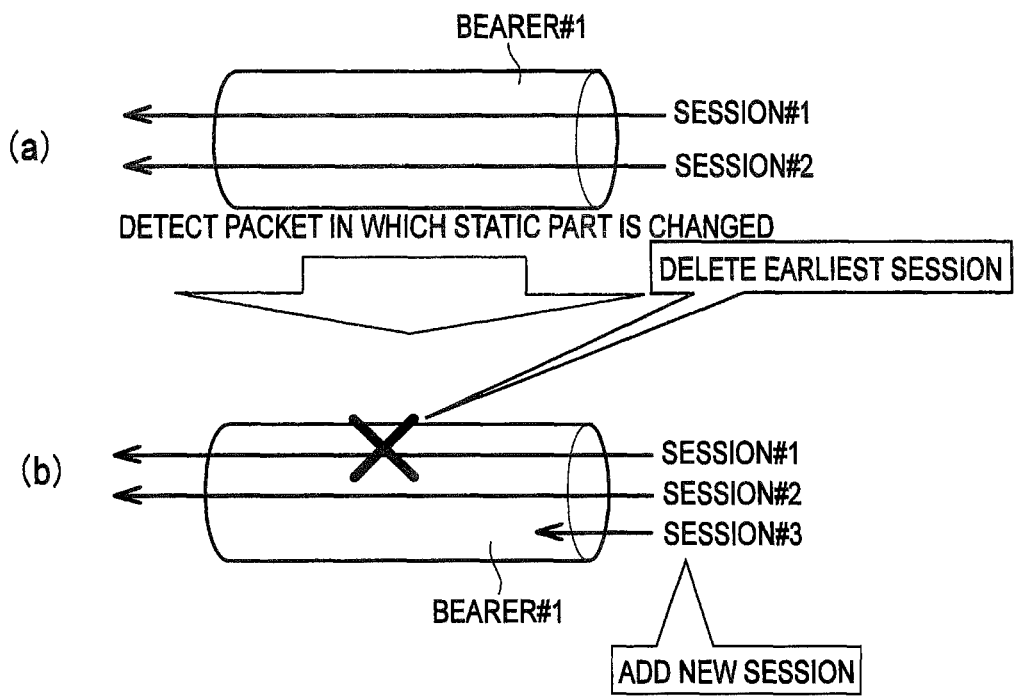
FIG. 3 is a diagram for explaining an operation of the mobile communication system according to the first embodiment of the present invention.

With reference to FIGS. 1 to 4, description is provided for a mobile communication system according to a first embodiment of the present invention. As an example of the mobile communication system in the present embodiment, an LTE mobile communication system is illustrated. However, the present invention is applicable to any mobile communication system other than LTE.

As illustrated in FIG. 1, the mobile communication system in the present embodiment includes a radio base station eNB and a mobile station UE.

In the example of FIG. 1, a bearer#1 is established between the radio base station eNB and the mobile station UE. The bearer#1 may be either a voice bearer or a video bearer.

Here in the present embodiment, the maximum number of sessions (for example, RTP sessions or RTCP sessions) allowed to be established simultaneously in the bearer#1 is assumed to be "two", which is determined based on a capability of the radio base station eNB or the mobile station UE.

As illustrated in FIG. 2, the radio base station eNB according to the present embodiment includes a transmission unit 11, a reception unit 12, a communication control unit 13, and a detection unit 14.

The transmission unit 11 is configured to transmit a packet (for example, an RTP packet or an RTCP packet) in a session established with the mobile station UE. The reception unit 12 is configured to receive a packet (for example, an RTP packet or an RTCP packet) in a session established with the mobile station UE.

The communication control unit 13 is configured to control communication via the session (for example, an RTP session or an RTCP session) with the mobile station UE.

The detection unit 14 is configured to detect a change in a "Static part" in a header of a packet (for example, a RTP packet or an RTCP packet) received by the reception unit 12, namely detect a packet in which a "Static part" is changed.

For example, the detection unit 14 may be configured to detect a change in a "Static part" based on a header of a downlink packet received via an S1 interface.

Specifically, the detection unit 14 may be configured to analyze the content in the header of the downlink packet received via the S1 interface to detect the change in the "Static part".

Alternatively, the detection unit 14 may be configured to detect the change in the "Static part" based on whether or not the packet received from the mobile station UE is an IR (Initialization and Refresh) packet having a new Add-CID.

Specifically, the detection unit 14 may be configured to detect the change in the "Static part" when the packet received from the mobile station UE is an IR packet having a new Add-CID (context identifier).

Meanwhile, the communication control unit 13 is configured such that when the detection unit 14 detects the change in the "Static part" in the header of the packet received by the reception unit 12, even if adding a new session to transmit the packet makes the number of sessions established in the bearer#1 exceed the capability of the radio base station eNB or the mobile station UE, the communication control unit 13 adds the new session and transmits the packet via the new session.

The communication control unit 13 is configured to delete (discard) an existing session (context) in the bearer#1 and add the aforementioned new session to the bearer#1 in this case.

Here, the communication control unit 13 may be configured to delete an earliest established session of the existing sessions in the bearer#1.

The communication control unit 13 may be configured to operate as follows. For example, when the detection unit 14 detects a packet in which a "Static part" is changed in a state where sessions #1 and #2 are established in the bearer#1 as illustrated in FIG. 3(a), the number of sessions established in the bearer#1, if a new session #3 is added, exceeds the capability of the radio base station eNB or the mobile station UE, and therefore the communication control unit 13 may delete the session #1 which is the earliest established session of the existing sessions #1 and #2 in the bearer#1 and establishes a new session #3 as illustrated in FIG. 3(b).

Hereinafter, with reference to FIG. 4, description is provided for an operation of the radio base station eNB according to the present embodiment.

Figure 4:
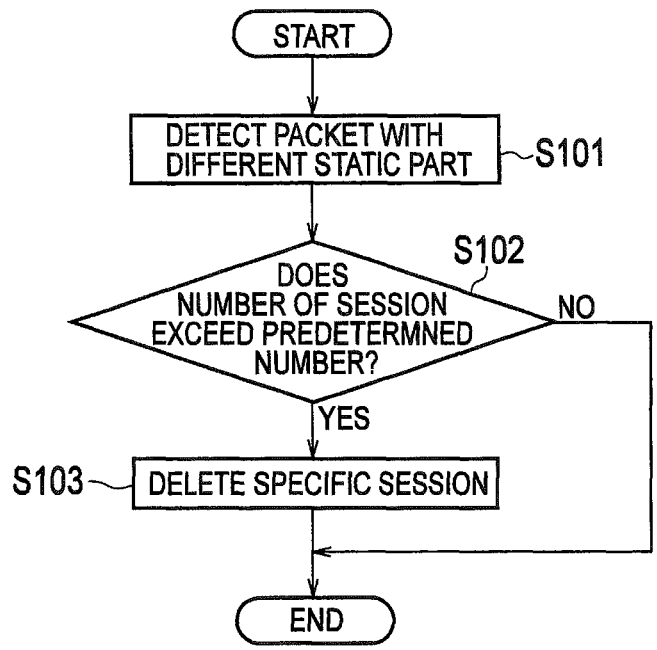
FIG. 4 is a flowchart presenting an operation of the radio base station eNB according to the first embodiment of the present invention.

As illustrated in FIG. 4, when the radio base station eNB detects a packet in which a "Static part" is changed in step S101, the radio base station eNB determines in step S102 whether or not the number of sessions established in the bearer#1 exceeds the capability of the radio base station eNB or the mobile station UE (a predetermined number of sessions) if a new session is added to transmit the detected packet.

If the result is "Yes", the operation proceeds to step 103, and if "No", the operation is terminated.

In step 103, the radio base station eNB deletes a specific session in the bearer#1, for example the earliest established session among the existing sessions in the bearer#1.

Note that "earliest" may be the earliest on a time basis or the smallest in the value of the context identifier.

(Mobile Communication System According to Second Embodiment of the Present Invention)

Figure 5:
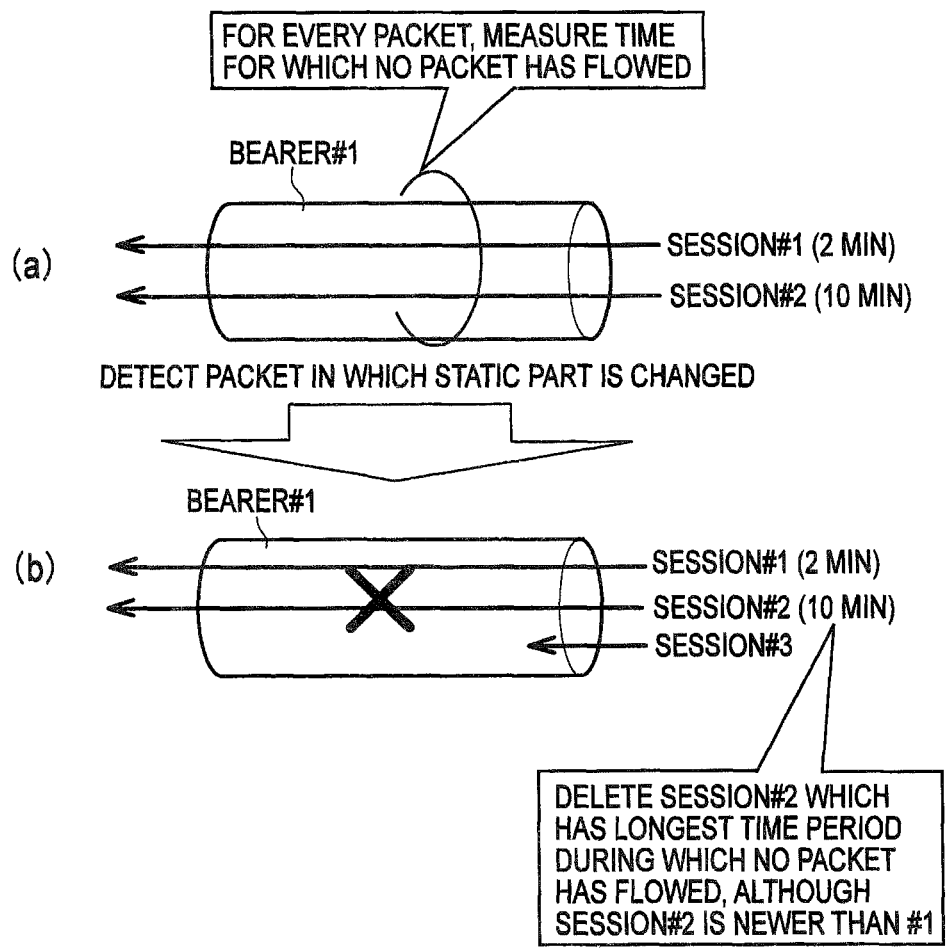
FIG. 5 is a diagram for explaining an operation of a mobile communication system according to a second embodiment of the present invention.

With reference to FIG. 5, description is provided for a mobile communication system according to a second embodiment of the present invention, focusing on differences from the aforementioned mobile communication system in the first embodiment.

In a radio base station eNB according to the present embodiment, a communication control unit 13 is configured such that when a detection unit 14 detects a change in a "Static part" in a header of a packet received by a reception unit 12, even if adding a new session to transmit the packet makes the number of sessions established in a bearer#1 exceed a capability of the radio base station eNB or a mobile station UE, the communication control unit 13 adds the new session and transmits the packet via the new session.

The communication control unit 13 is configured to delete (discard) an existing session (context) in the bearer#1 and add the aforementioned new session in this case.

Here, the communication control unit 13 may be configured to delete a session, in which no packet has been transmitted for a predetermined time, of the existing sessions in the bearer#1.

For example, consider a case where the detection unit 14 detects a packet in which a "Static part" is changed when sessions #1 and #2 are established in the bearer#1 as illustrated in FIG. 5(a).

Here, assume that time periods during which no packet flows are two minutes in the session #1, and ten minutes in the session #2.

In this case, adding a new session #3 makes the number of sessions established in the bearer#1 exceed the capability of the radio base station eNB or the mobile station UE. To address this, the communication control unit 13 may be configured to delete the session #2 in which no packet has flowed for a predetermined time (for example, five minutes) out of the existing sessions #1 and #2 in the bearer#1 and to establish the new session #3 as illustrated in FIG. 5(b).

Here, the communication control unit 13 may be configured to delete a session having the longest time period during which no packet has been transmitted if there are multiple sessions in which no packet has flowed for the predetermined time.

(Mobile Communication System According to Third Embodiment of the Present Invention)

Figure 6:
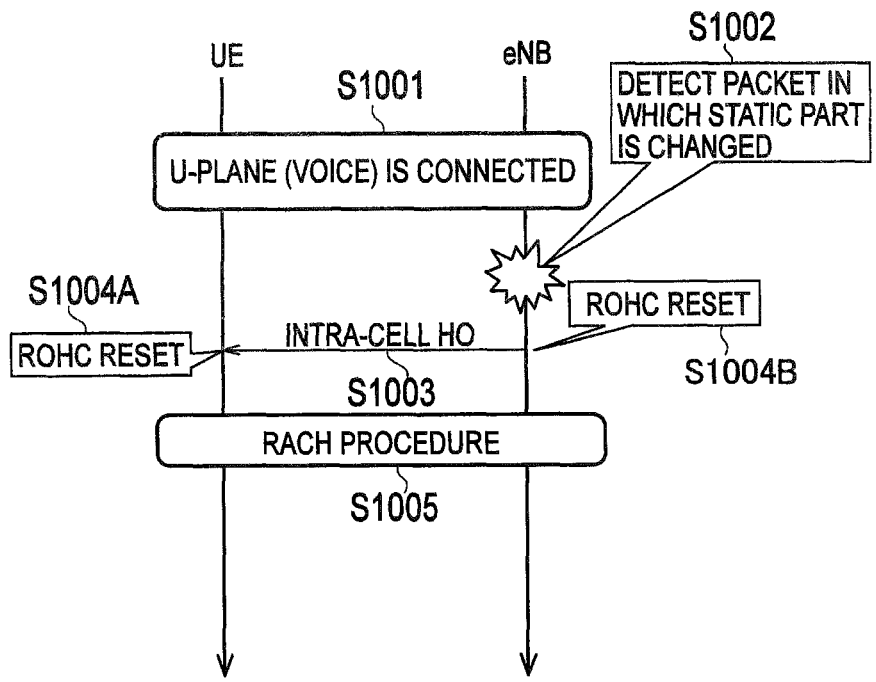
FIG. 6 is a sequence diagram for explaining an operation of a mobile communication system according to a third embodiment of the present invention.

With reference to FIG. 6, description is provided for a mobile communication system according to a third embodiment of the present invention, focusing on differences from the aforementioned mobile communication system in the first embodiment.

In a radio base station eNB according to the present embodiment, a communication control unit 13 is configured such that when a detection unit 14 detects a change in a "Static part" in a header of a packet received by a reception unit 12, even if adding a new session to transmit the packet makes the number of sessions established in a bearer#1 exceed a capability of the radio base station eNB or a mobile station UE, the communication control unit 13 adds the new session and transmits the packet via the new session.

The communication control unit 13 may be configured to start an Intra-cell handover of the mobile station UE in this case.

Hereinafter, with reference to FIG. 6, description is provided for an operation of the mobile communication system according to the present embodiment.

As illustrated in FIG. 6, in step S1001, the bearer#1 (for example, a voice bearer) is established (U-plane is connected) between the mobile station UE and the radio base station eNB. In this state, when the radio base station eNB detects a packet in which "Static part" is changed in a session in the bearer#1 in step S1002, the radio base station eNB gives an instruction to the mobile station UE to perform the Intra-cell handover in step S1003.

In this case, the mobile station UE resets ROHC in step S1004A and the radio base station eNB resets ROHC in step S1004B.

Thereafter, in step 1005, the mobile station UE and the radio base station eNB perform an RACH procedure, and establish a new session in the bearer#1.

(Mobile Communication System According to Fourth Embodiment of the Present Invention)

Figure 7:
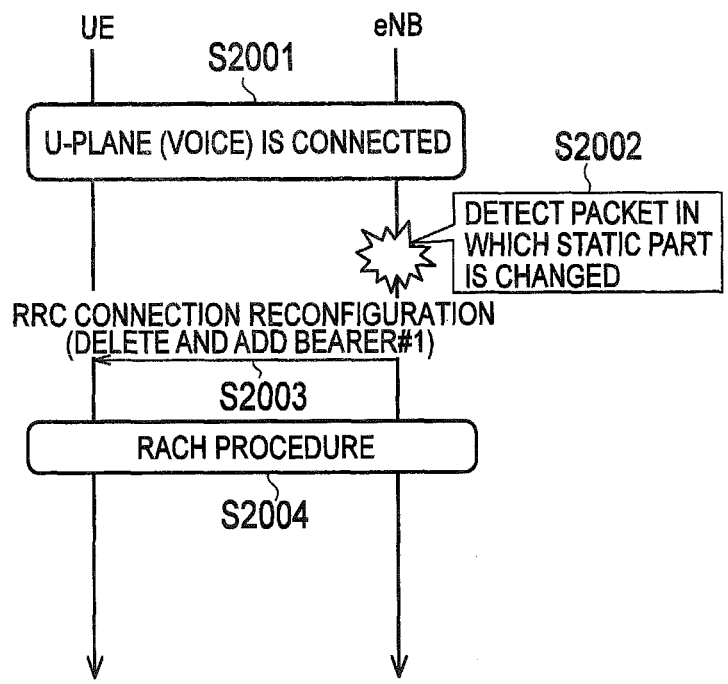
FIG. 7 is a sequence diagram for explaining an operation of a mobile communication system according to a fourth embodiment of the present invention.
Figure 8:
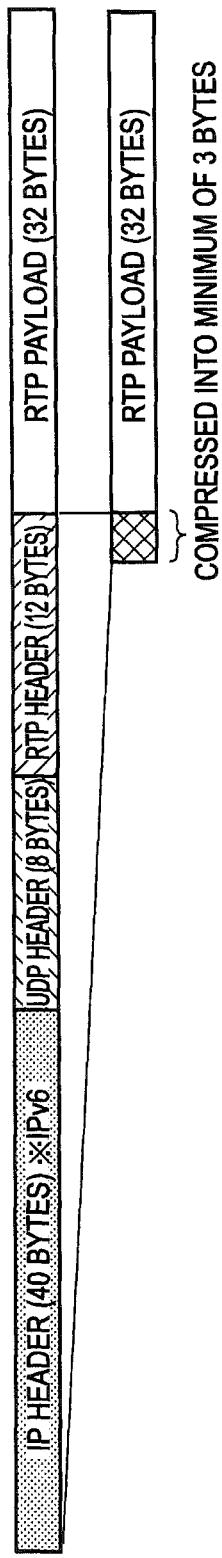
FIG. 8 is a diagram for explaining a conventional technique.

With reference to FIG. 7, description is provided for a mobile communication system according to a fourth embodiment of the present invention, focusing on differences from the aforementioned mobile communication system in the first embodiment.

In a radio base station eNB according to the present embodiment, a communication control unit 13 is configured such that when a detection unit 14 detects a change in a "Static part" in a header of a packet received by a reception unit 12, even if adding a new session to transmit the packet makes the number of sessions established in a bearer#1 exceed a capability of the radio base station eNB or a mobile station UE, the communication control unit 13 adds the new session and transmits the packet via the new session.

The communication control unit 13 may be configured to delete a bearer#1 once and add the same bearer#1 again in this case.

Here, the communication control unit 13 may be configured to send a single RRC message to give an instruction to the mobile station UE to delete and add the bearer#1 (for example, an "RRC connection reconfiguration").

Hereinafter, with reference to FIG. 7, description is provided for an operation of the mobile communication system according to the present embodiment.

As illustrated in FIG. 7, in step S2001, the bearer#1 (for example, a voice bearer) is established (U-plane is connected) between the mobile station UE and the radio base station eNB. In this state, when the radio base station eNB detects a packet in which a "Static part" is changed in a session in the bearer#1 in step S2002, the radio base station eNB transmits an "RRC connection reconfiguration" to the mobile station UE to give an instruction to delete and add the bearer#1 in step S2003.

Thereafter, in step 2004, the mobile station UE and the radio base station eNB perform an RACH procedure, and establish a new session in the bearer#1.

The foregoing features of the present embodiment may be expressed as follows.

In summary, a first feature of the present embodiment is a radio base station eNB including a communication control unit 13 configured to control communication with a mobile station UE via a session (an RTP session or an RTCP session). The communication control unit 13 is configured such that, when a change in a "Static part (static part)" in a header of a received packet is detected, even if adding a new session to transmit the packet makes the number of sessions established in a bearer#1 exceed a capability of the radio base station eNB or the mobile station UE, the communication control unit 13 adds the new session and transmits the packet via the new session.

According to this feature, when the radio base station eNB detects a packet in which a "Static part" is changed in a session established in the bearer#1, the radio base station eNB is able to add a new session and transmit the packet via the new session.

In the first feature of the present embodiment, the radio base station eNB may include a detection unit 14 configured to detect a change in a "Static part" based on a header of a packet received via an S1 interface.

According to this feature, the radio base station eNB is able to determine whether or not the "Static part" of the packet has been changed by interpreting a content in the header of the packet received via the S1 interface.

In the first feature of the present embodiment, the radio base station eNB may include a detection unit 14 configured to detect the change in the "Static part" based on whether or not the packet received from the mobile station UE is an IR packet having a new Add-CID.

According to this feature, when the packet received from the mobile station UE is an IR packet having a new Add-CID, the radio base station eNB is able to determine that the "Static part" in the packet is changed.

In the first feature of the present embodiment, the communication control unit 13 may be configured such that, when the change in the "Static part" is detected and adding the new session makes the number of sessions established in the bearer#1 exceed the capability of the radio base station eNB or the mobile station UE, the communication control unit 13 deletes the earliest established session among the sessions established and establishes the new session.

According to this feature, by deleting the earliest established session among the sessions established, the radio base station eNB is able to add the new session to transmit the packet in which the "Static part" is changed, even if adding the new session makes the number of sessions established in the bearer#1 exceed the capability of the radio base station eNB or the mobile station UE.

In the first feature of the present embodiment, the communication control unit 13 may be configured such that, when the change in the "Static part" is detected and adding the new session makes the number of sessions established in the bearer#1 exceed the capability of the radio base station eNB or the mobile station UE, the communication control unit 13 deletes a session in which no packet has been transmitted for a predetermined time, among the sessions established and establishes the new session.

According to this feature, by deleting the session in which no packet has been transmitted for the predetermined time, among the sessions established, the radio base station eNB is able to add the new session to transmit the packet in which the "Static part" is changed even if adding the new session makes the number of sessions established in the bearer#1 exceed the capability of the radio base station eNB or the mobile station UE.

In the first feature of the present embodiment, the communication control unit 13 may be configured to start an Intra-cell handover when the change in the "Static part" is detected and adding the new session makes the number of sessions established in the bearer#1 exceed the capability of the radio base station eNB or the mobile station UE.

According to this feature, even if adding the new session makes the number of sessions established in the bearer#1 exceed the capability of the radio base station eNB or the mobile station UE, the radio base station eNB is able to add the new session to transmit the packet in which the "Static part" is changed, by starting the Intra-cell handover.

In the first feature of the present embodiment, the communication control unit 13 may be configured to delete the bearer#1 once and add the same bearer#1 again when the change in the "Static part" is detected and adding the new session makes the number of sessions established in the bearer#1 exceed the capability of the radio base station eNB or the mobile station UE.

According to this feature, even if adding the new session makes the number of sessions established in the bearer#1 exceed the capability of the radio base station eNB or the mobile station UE, the radio base station eNB is able to add the new session to transmit the packet in which the "Static part" is changed by deleting the bearer#1 once and adding the same bearer#1 again.

In the first feature of the present embodiment, the communication control unit 13 may be configured to send a single RRC message to give an instruction to the mobile station UE to delete and add the bearer#1.

According to this feature, it is possible to avoid an unnecessary transmission of a signal by utilizing the existing "RRC connection reconfiguration" to give the instruction to delete and add the bearer#1.

Although the capability of the radio base station eNB or the mobile station UE is referred to in the above, the number of sessions per bearer may be limited by a configuration parameter of the network.

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2013-211023 (filed on Oct. 8, 2013) is incorporated by reference in the present specification.

INDUSTRIAL APPLICABILITY

As has been described above, according to the present invention, it is possible to provide a radio base station capable of, when a packet in which a "Static part" is changed is detected in a session established in a bearer, preventing the packet from being discarded.

EXPLANATION OF THE REFERENCE NUMERALS

UE mobile station
eNB radio base station
11 transmission unit
12 reception unit
13 communication control unit
14 detection unit

The invention claimed is:
1. A radio base station comprising:
a processor that controls communication with a mobile station via one or more sessions in a bearer;
wherein the processor detects a change of at least one of an IP address and an SSRC (Synchronization Source) in a compressed header of a packet,
wherein when (i) a current number of established sessions is equal to a maximum number of sessions that can be supported by the radio base station or the mobile station and (ii) the processor attempts to add a new session in which header compression is applied, upon detection of the change of the at least one of the IP address and the SSRC, the processor deletes one of the established sessions to which header compression is applied and adds the new session; and
a transmitter that transmits the packet via the new session.

* * * * *